April 5, 1927. 1,623,422
R. M. LOVEJOY
TORQUE ABSORBING SPRING CONSTRUCTION FOR VEHICLES
Filed March 26, 1925 2 Sheets-Sheet 1
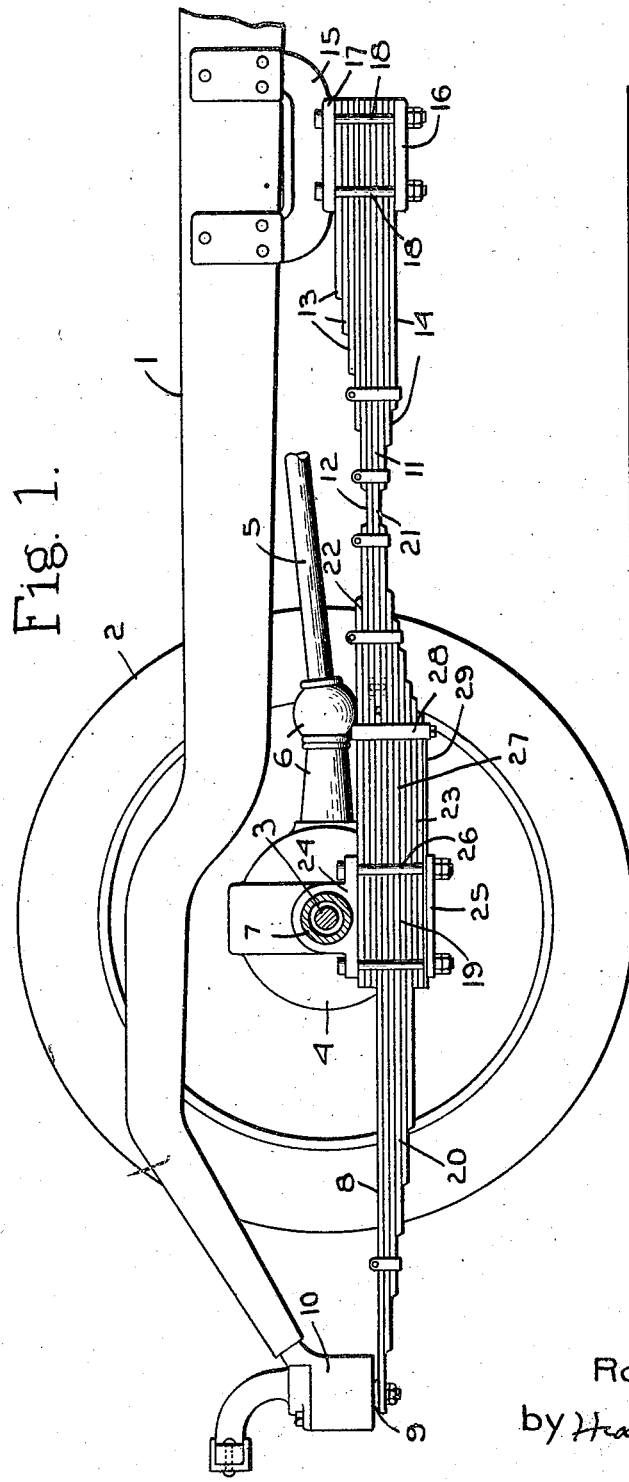
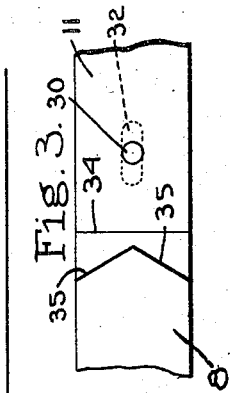
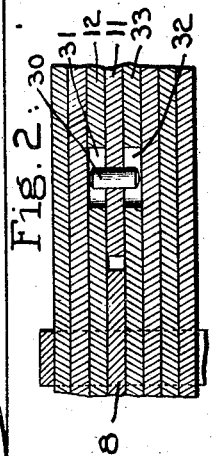
Inventor.
Ralph M. Lovejoy
by Heard Smith Tennant
Attys.

April 5, 1927.  R. M. LOVEJOY  1,623,422
TORQUE ABSORBING SPRING CONSTRUCTION FOR VEHICLES
Filed March 26, 1925    2 Sheets-Sheet 2
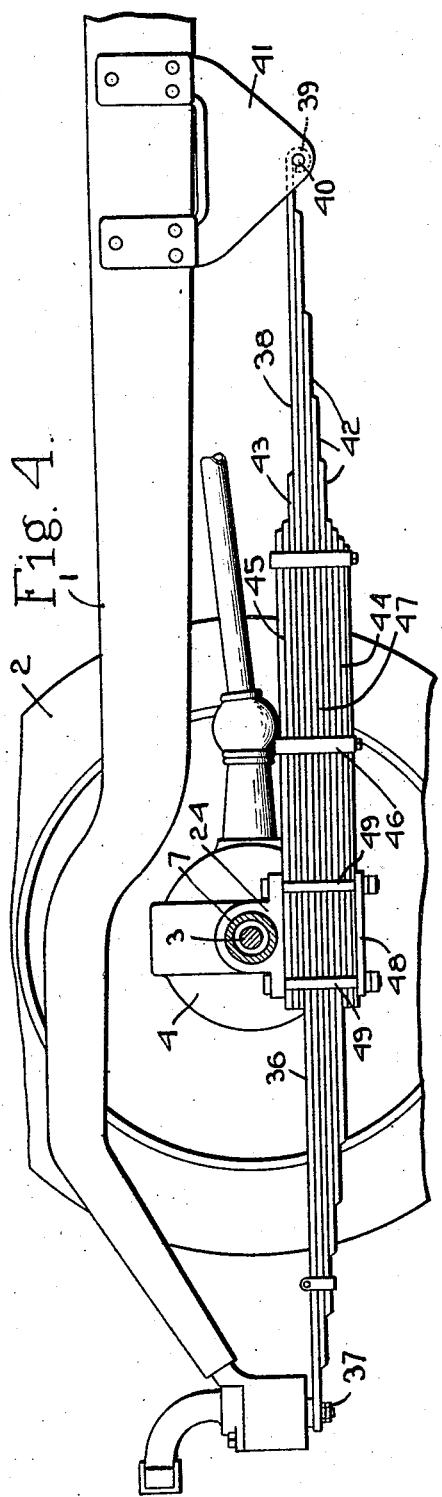
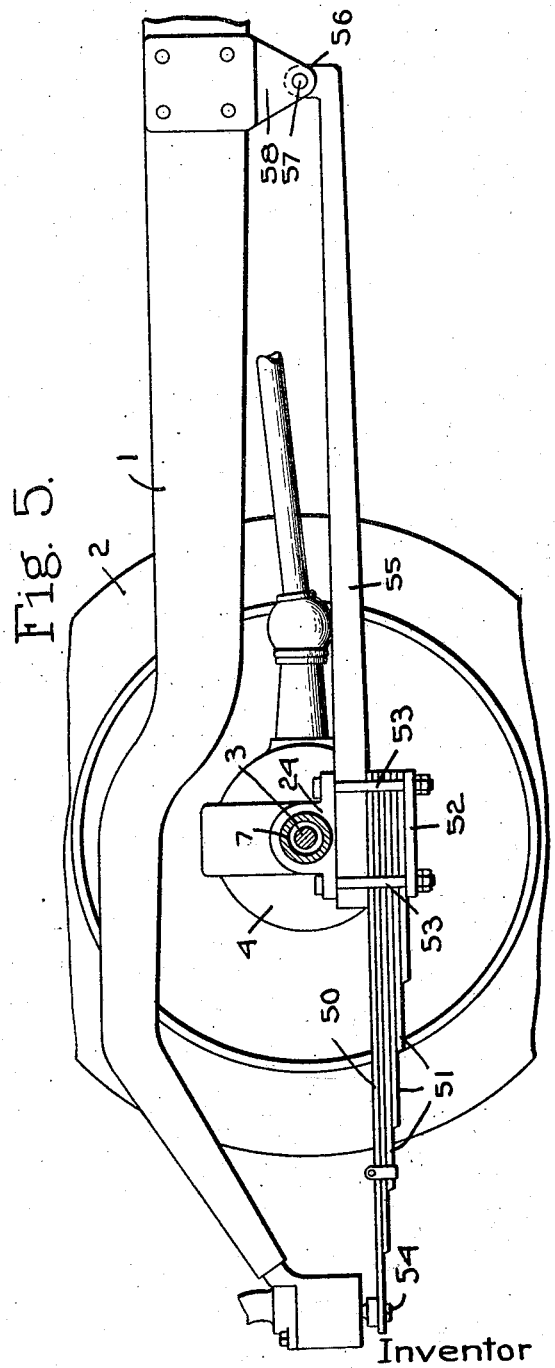
Inventor
Ralph M. Lovejoy
Attys.

Patented Apr. 5, 1927.

1,623,422

UNITED STATES PATENT OFFICE.

RALPH M. LOVEJOY, OF BOSTON, MASSACHUSETTS.

TORQUE-ABSORBING SPRING CONSTRUCTION FOR VEHICLES.

Application filed March 26, 1925. Serial No. 18,385.

This invention relates to improvements in vehicle spring constructions and the general object thereof is to provide a spring construction in which the movement of the axle relatively to the vehicle will be directed in a path substantially normal to the horizontal plane of the vehicle frame and the tendency to movement of the axle in a direction longitudinally of the vehicle will be overcome. This is accomplished in the preferred embodiment of the invention illustrated herein by means of a leaf spring rigidly mounted upon the axle of the vehicle and having one end so connected to the frame, preferably at the end thereof, as to permit relative longitudinal movement therebetween and by providing a relatively rigid section extending in the opposite direction and so anchored to the frame that the rigid section will in effect provide a radius which will direct the movement of the axle in a path substantially perpendicular to the horizontal plane of the frame.

It is well known that where the vehicle frame is supported from an axle which is subject to torque, such as the rear axle of an automobile which is subject not only to the torque of the driving mechanism, but also to a braking torque and also front axles which are subjected to torque when front wheel brakes are employed, the moment of torque resistance imposes a heavy load upon the spring which unbalances its action upon the frame of the vehicle. In many instances this torque in addition to the weight of the body of the vehicle imposed upon the spring results in the breaking of the spring. As a consequence many vehicles are provided with torque rods to prevent the imposition upon the spring of this torque resistance.

An important object of the invention is to provide a spring construction for an axle which is subject to torque which will avoid the necessity of providing torque rods to prevent undue stress upon the spring and possible breakage thereof when the axle is subjected to driving and particularly to braking torque. In usual constructions the torque rods which connect the axle to the frame include universal joints which rapidly become worn and when worn permit vibration of the axle and considerable attendant noise. By the present invention these torque rods are entirely eliminated.

A further object of the invention is to provide a spring construction for an axle which is subjected to torque such as driving or braking torque, with means for reducing the effective force factor of the moment of torque upon the spring. This is accomplished in the preferred embodiment of the invention disclosed herein by providing a leaf spring having at one end a connection to the frame which will permit relative longitudinal movement therebetween with a rigid arm extending in the opposite direction such distance as to provide an effective leverage which will reduce the resistance required of the resilient portion of the spring to overcome the torque.

A further object of the invention is to provide a spring of this character which can be applied to usual types of vehicles without changing the relative position of the axle to the end of the frame. This is accomplished by providing a spring having resilient sections located upon opposite sides of the axle and preferably of different lengths offering different resistances with means rigidly connected to the axle extending therefrom in the direction of the flexible portion of the spring which offers the greatest resistance such a distance as to reduce the effective force factor of the moment of torque upon the adjacent resilient section.

A further object of the invention is to provide a construction of this character which will equalize the frame supporting action of the resilient sections of the spring.

A further object of the invention is to provide a novel spring construction in which the long leaf of the spring which is connected at its ends to the vehicle frame may be made in sections rather than as a unit. It is well known that long springs are difficult of construction and when broken are expensive in replacement. The present invention contemplates the production of a leaf spring comprising a long leaf formed in sections, preferably located in alinement, and so assembled with the shorter leaves, as to permit relative longitudinal movement between the sections of the long leaf. By reason of this construction the sectional long leaf can be made much more economically than a unitary long leaf and if broken can be readily and economically replaced.

Other objects and features of the invention will more fully appear from the following description and the accompanying drawings and will be particularly pointed out in the claims.

In the drawings:

Fig. 1 is a side elevation of the end portion of the vehicle having an axle which is subject to torque and a preferred form of spring embodying the present invention;

Fig. 2 is a detail vertical sectional view of a portion of the superimposed leaves of the spring illustrating the main leaf as made in longitudinally alined sections clamped between adjacent superimposed leaves;

Fig. 3 is a detail plan view illustrating particularly the sections of the long leaf in which the end of one section is disposed in angular relation to the other for the purpose of discharging material which may accumulate between the adjacent ends of the sections of the leaves;

Fig. 4 is a side elevation of the end portion of the vehicle similar to Fig. 1, illustrating a different form of spring construction embodying the invention; and, Fig. 5 is a similar view showing another form of spring construction embodying the invention.

The preferred embodiment of the invention which is illustrated in Figs. 1, 2 and 3 is of the type illustrated in my prior Patent No. 1,443,139 granted January 23, 1923 and illustrates the manner in which the present invention can be applied to a spring construction of that type.

The drawings illustrate a conventional form of automobile frame 1, a driving wheel or rear wheel 2 which is driven by one of the differentially actuated shafts 3 through the usual differential (not shown) which is enclosed in the differential housing 4. As is usual in such constructions the driving shaft 5 is connected by a universal joint to a relatively short shaft which actuates the differential, which shaft and universal joint are enclosed in an extension 6 of the differential housing. The differential housing is integral with and forms a part of the axle 7.

The preferred form of spring construction embodying the present invention comprises a main resilient leaf which is fixedly connected to the frame and an oppositely extending portion or a separate leaf which is located between two symmetrical series of superimposed leaves of successively decreasing length which are rigidly secured to the frame and a central section comprising successively shorter leaves superimposed upon the long leaves and rigidly connected to the axle, said superimposed leaves extending mainly toward the rigidly supported end of the leaf. The superimposed leaves of this body are rigidly secured together a portion of their length to provide in effect a rigid bar which forms an arm or a lever extending toward the flexible portion of the leaf so that the effective force factor of the moment of torque resistance is caused to act through a relatively long leverage upon the adjacent resilient portion of the spring and the effective torque resistance thereby greatly reduced in its action upon the spring. Desirably the body of the leaves which are thus secured together is substantially equal in length to the distance from the axle to the universal joint of the driving shaft so that the flexure of the spring will act in consonance with the movement of the universal joint.

In the particular embodiment of the invention illustrated herein the spring comprises a main leaf 8 which is flexibly connected at its end to a shackle 9 which is pivotally mounted in a shackle housing 10 which is secured to the end of the frame 1. The opposite end of the main leaf 8 extends beyond the axle, and, as illustrated herein, beneath the axle. Preferably the main spring 8 is provided with a supplemental section 11 which lies in the same plane and is secured to the body of the vehicle and underlies a long spring 12 which overlaps the main spring 8 at the axle. The leaves 11 and 12 which extend from the axle toward the opposite end of the vehicle are located between two series 13 and 14 of superimposed leaves of successively decreasing length, the ends of all of said leaves being secured together and to a bracket 15 depending from the frame by a suitable spring clamp 16.

As illustrated herein the bracket 15 is riveted to the frame and is provided with a laterally extending shelf 17 to which the spring clamping plate 16 is secured by pairs of bolts 18 located upon opposite sides of the superimposed springs. The spring comprises a central section 19 which consists of a series 20 of progressively shorter leaves which underlie the main long leaf 8 and extend beyond the axle toward the end of the long leaves which are secured between the superimposed series of successively shorter leaves, but terminate sufficiently short thereof to leave an intermediate flexible section 21 composed only of the leaves 11 and 12. Desirably one or more leaves 22 (two as shown herein) are superimposed above the long leaf 12 and other shorter leaves 23 (two of which are illustrated herein) are superimposed upon those beneath the axle and extend toward the fixed end of the spring. The long leaves and the shorter leaves which are superimposed upon opposite sides of the long leaves are secured together and to a bracket 24 upon the axle housing by a clamping plate 25 and pairs of bolts 26 located adjacent opposite edges of the spring leaves.

In order to reduce the effective force factor of the moment of torque which is applied to the spring a body 27 of superimposed leaves are rigidly secured together by a clamp 28 which is located at a predetermined distance from the vertical plane of the center of the axle, the clamp 28 desirably being in proximity to the position of the universal joint which connects the shaft 5 to the short shaft which drives the differential. The rigid body of spring leaves thus provided is substantially inflexible and in effect provides an arm which is rotatable about the axis of the driving shaft 3 so that the effective force factor of the moment of torque is applied to the spring at or beyond the end of this arm and its action upon the spring greatly reduced by reason of the long leverage through which the torque acts upon the spring. If desired the clamp 28 may be held against slippage by a plate 29 which underlies the spring leaves, which are superimposed beneath the axle, and is secured at one end to the clamping plate and at the other clamped with the leaves to the axle.

The supplemental section 11 of the long leaf desirably is slightly spaced apart from the adjacent end of the leaf 8 and is provided adjacent its end with a pin 30 which is slidably mounted in guideways or slots 31 and 32 formed in and extending longitudinally of the overlapping long leaf 12 and an underlying leaf 33. By reason of this construction the section 11 is permitted to have a longitudinal sliding movement upon flexure of the intermediate flexible section of the rigidly anchored portion of the spring. By reason of this construction the superimposed leaves 11 and 12 offer greater resistance than the main leaf 8 of the spring so that the flexible section 21 of the spring is capable of withstanding the effective force factor of the moment of torque resistance in addition to sustaining the force imposed upon it by the weight of the vehicle. By properly proportioning the rigid central body of the spring relatively to the flexible portions of the spring, the spring may be so constructed that under normal running conditions the force factor of the moment of torque applied to the flexible central portion of the spring will be such as to cause this flexible central portion to be substantially equal in resistance to that of the end portion of the main long leaf 8 so that the effective spring action upon the frame of the vehicle upon opposite sides of the frame will be substantially equal and the axle will move substantially vertically relatively to the mean horizontal plane of the frame when the wheel is raised by an obstruction or drops by reason of a hole or cavity in a road. Furthermore by thus reducing the effective force factor of the moment of torque resistance upon the intermediate flexible portion 21 of the spring the variation in the action of the torque upon the spring by variations in driving power and by reason of the transmission of braking power through the axle to the wheel will have no serious effect upon the spring and breakage will thereby be entirely eliminated.

By reason of the present construction the portion of the spring which extends from the axle beneath the vehicle frame and away from the end of the frame may be made considerably longer than in usual constructions and in fact of any desirable length without necessitating any change in the position of the axle relatively to the end of the frame. Therefore, a longer and more easily riding spring may be employed.

Inasmuch as the flexibility of the spring is dependent upon the number of superimposed leaves, shorter superimposed leaves may be removed or added as may be found desirable to adjust the resiliency of the spring to any weight of vehicle and difference of torque. Such adjustment can be made at the time the spring is installed or at any time thereafter without inconvenience.

The adjacent ends of the long or main leaf desirably present surfaces which are disposed in angular relation to each other adapted to force out any debris which may accumulate between the adjacent ends of the leaves. As illustrated herein the end 34 of the section 11 of the long leaf is perpendicular to the axis of the leaf while the other section 8 of the main leaf is provided with a V-shaped end portion presenting surfaces 35 which incline relatively to the end 34 of the leaf 11 so that the spaces between the adjacent ends of the leaf sections 8 and 11 are wider at the outer edges than at the middle. Any debris, therefore, which might accumulate between the adjacent ends of the leaves will be forced outwardly without blocking the relative movement of the sections of the leaves.

In Fig. 4 a modified spring construction is shown. In this construction one of the flexible end portions 36 of the long leaf is connected by a shackle 37 to the end of the frame to permit relative longitudinal movement between the spring and frame while the other flexible end section 38 of the long leaf is anchored to the frame as by an eye 39 which embraces a stud 40 upon a bracket 41 which is rigidly secured to the frame. The central portion of the spring is provided with a series of progressively shorter leaves 42 superimposed upon the lower side of the long leaf and one or more leaves 43 upon the upper side of the long leaf. Other leaves 44 and 45 of any suitable number and desirably of equal length are applied to the lower and upper sides of the superimposed leaves 42 and 43 respectively and all of the leaves thus superimposed are secured together by suitable clamps 46 to provide a rigid arm 47 extending from the axle toward the anchored end of the spring. All of these superimposed leaves are secured to the axle by a clamping plate 48 and bolts 49 which engage the spring seat 24 of the axle 7.

In this construction, as in the previous construction, the rigid arm 47 of the spring construction which is pivotally mounted upon the stud 49 acts to direct the movement of the axle relatively to the frame in a path substantially perpendicular to the horizontal plane of the frame. This arm also provides in effect a lever which reduces the effective force factor of the moment of torque upon the flexible portion or portions of the spring and consequently equalizes the action of the spring upon the frame.

In the construction illustrated in Fig. 5 the resilient portion of the spring construction comprises a long leaf 50 and a plurality of progressively shorter leaves 51 which are superimposed upon the lower side of the spring and are clamped together and to the axle by a plate 52 and bolts 53 which engage the spring seat 24 of the axle. In this construction, as in previous constructions, the end of the long leaf 50 is connected to a shackle 54 which permits relative longitudinal movement between the end of the spring and the frame. In this spring construction, however, a rigid bar 55 is clamped between the end of the built-up leaf spring and the axle by the clamping plate 52 and bolts 53. The bar 55 extends from the axle beneath the frame and is provided with an offset end 56 having an eye which is journalled upon a stud 57 in a bracket 58 which is rigidly secured to the frame. However, other forms of flexible connections may be used.

In this construction, as in those previously described, the bar 55 acts as a radius rod to direct the movement of the axle relatively to the frame in the path substantially normal to the horizontal plane of the frame and also acts to reduce and practically to eliminate the force of torque resistance which otherwise would be imposed upon the frame. In this construction the resilient portion of the spring supports the frame without being subjected to any substantial torque action.

It will thus be obvious that various modifications may be made in construction and arrangement of parts of mechanisms embodying the present invention and it will, therefore, be understood that the particular constructions shown in the drawings are illustrative and not restrictive within the meaning and scope of the following claims.

Having thus described the invention, what is claimed as new, and desired to be secured by Letters Patent, is:

1. A vehicle spring construction comprising a leaf spring mounted upon the axle of the vehicle and having a resilient end portion extending in one direction from the axle and flexibly connected at its end to the end of the frame and a relatively rigid section extending from the axle in the opposite direction and flexibly secured to the frame.

2. A vehicle spring construction comprising a spring mounted upon the axle of the vehicle having a section composed of a series of leaves of successively increasing length rigidly secured to the axle, the long leaf thereof having a section flexibly connected to the end of the vehicle frame to permit relative longitudinal movement therebetween and a resilient section extending from said axle in the opposite direction and anchored at its end to the frame and provided with a relatively rigid re-enforcing portion secured thereto and to the axle and extending a portion of the length thereof.

3. A spring construction for supporting a vehicle frame upon an axle which is subject to torque comprising a leaf spring mounted upon the axle having a section extending in one direction flexibly connected at its end to the frame and having a section extending in the opposite direction also connected to the frame and relatively rigid means associated with the latter rigidly secured to the axle and acting thereupon at a predetermined distance from the axle to reduce the effective force factor of the moment of torque upon the spring.

4. A spring construction for supporting a vehicle frame upon an axle comprising a plurality of superimposed leaves of successively increasing length mounted upon said axle and having sections extending different distances therefrom in opposite directions, means connecting the end of the shorter section to the frame to permit relative longitudinal movement therebetween, means anchoring the end of the longer section to the frame and relatively rigid re-enforcing means secured to the axle and to the longer section of the spring extending from the axle a portion of the length of said longer section.

5. A vehicle spring construction for supporting a vehicle frame upon an axle which is subject to torque comprising a leaf spring connected to the axle having resilient sections extending therefrom in opposite directions and offering different resistances and relatively rigid means connected to the axle acting upon said spring to reduce the effective force factor of the moment of torque upon the resilient section offering the greater resistance.

6. A vehicle spring construction for supporting a vehicle frame upon an axle which is subject to torque comprising a leaf spring connected to the axle having flexible sections extending therefrom in opposite directions and offering different resistances connected to the vehicle frame and substantially inflexible means rigidly secured to the axle and extending therefrom along the flexible section offering the greater resistance and acting thereupon to reduce the force factor of the moment of torque imparted therefrom to such flexible section.

7. A vehicle spring construction for supporting a vehicle frame upon an axle which is subject to torque comprising a leaf spring having one end flexibly connected to the end of the frame and the other end formed to offer greater resistance and anchored to the vehicle frame and an intermediate section rigidly secured to the axle and having a substantially inflexible member extending from said axle along said spring toward the anchored end of the spring and of such length as to reduce the force factor of the moment of torque imparted therefrom to such flexible section and also operable normally to equalize the action of the resilient sections of the spring upon the vehicle frame.

8. A vehicle spring construction for supporting a vehicle frame upon an axle which is subject to torque comprising a leaf spring having a resilient leaf flexibly connected to the frame and an oppositely extending leaf anchored at its end to the frame between oppositely disposed superimposed series of progressively shorter leaves, a central section secured to the axle, a flexible section intermediate of said central section and said anchored end and relatively rigid means connected to the axle and extending therefrom in engagement with said resilient leaf toward the intermediate flexible section and acting to reduce the effective force factor of the moment of torque upon said intermediate flexible section.

9. A vehicle spring construction for supporting a vehicle frame upon an axle which is subject to torque comprising a leaf spring having a resilient leaf flexibly connected at its end to the frame and extending beyond the axle, an oppositely extending leaf having one end overlapping said leaf at the axle and having its opposite end located between symmetrically disposed series of progressively shorter leaves which are rigidly anchored to the frame, a series of leaves superimposed upon opposite sides of the overlapping leaves and rigidly clamped to the axle, the body of said superimposed leaves extending mainly toward the anchored end of the spring and acting to reduce the effective force factor of the moment of torque transmitted to the flexible portion of the spring intermediate of the adjacent ends of the respective superimposed series of leaves.

10. A vehicle spring construction for supporting a vehicle frame upon an axle which is subject to torque comprising a leaf spring having a main resilient leaf flexibly connected at its ends to the frame and extending beyond the axle, an oppositely extending leaf having one end overlapping said leaf at the axle and having its opposite end located between symmetrically disposed series of progressively shorter leaves which are anchored to the frame, including a supplemental leaf arranged in alinement with said main leaf, a series of leaves superimposed upon opposite sides of the overlapping leaves and supplemental leaf and rigidly clamped to the axle, the body of said superimposed leaves extending mainly toward the anchored end of the spring and acting to reduce the effective force factor of the moment of torque transmitted to the flexible portion of the spring intermediate of the adjacent ends of the respective superimposed series of leaves.

11. A vehicle spring construction for supporting a vehicle frame upon an axle which is subject to torque comprising a leaf spring having a main resilient leaf flexibly connected at its end to the frame and extending beyond the axle, an oppositely extending leaf having one end overlapping said leaf at the axle and having its opposite end located between symmetrically disposed series of progressively shorter leaves which are anchored to the frame, including a supplemental leaf arranged in alinement with said main leaf, the adjacent ends of the supplemental leaf and main leaf being spaced apart, a series of leaves superimposed upon opposite sides of the overlapping leaves and supplemental leaf and rigidly clamped to the axle, the body of said superimposed leaves extending mainly toward the anchored end of the spring and acting to reduce the effective force factor of the moment of torque transmitted to the flexible portion of the spring intermediate of the adjacent ends of the respective superimposed series of leaves.

12. A vehicle spring construction for supporting a vehicle frame upon an axle which is subject to torque comprising a leaf spring having a main resilient leaf flexibly connected at its end to the frame and extending beyond the axle, an oppositely extending leaf having one end overlapping said leaf at the axle and having its opposite end located between symmetrically disposed series of progressively shorter leaves which are rigidly secured to the frame, including a supplemental leaf arranged in alinement with said main leaf, the adjacent ends of the supplemental leaf and main leaf being spaced apart, a series of leaves superimposed upon opposite sides of the overlapping leaves and supplemental leaf and rigidly clamped to the axle, the body of said superimposed leaves extending mainly toward the anchored end of the spring and acting to reduce the effective force factor of the moment of torque transmitted to the flexible portion of the spring intermediate of the adjacent ends of the respective superimposed series of leaves and a pin in said supplemental leaf adjacent its end slidably mounted in guideways in juxtaposed leaves.

13. A vehicle spring construction comprising a long leaf formed in sections adapted to be connected at their remote ends to the vehicle frame, shorter leaves superimposed upon opposite sides of and overlapping the adjacent ends of the long leaf, means for clamping the superimposed leaves and one of the sections of the long leaf to the vehicle axle and means for slidably securing the adjacent end of the other section of the long leaf between the juxtaposed shorter leaves.

14. A vehicle spring construction comprising a long leaf formed in alined sections adapted to be connected at their remote ends to the vehicle frame, a plurality of successively shorter leaves superimposed respectively on opposite sides of and overlapping the adjacent ends of the long leaf, means for clamping the superimposed leaves and one of the sections of the long leaf to the axle and means for slidably securing the adjacent end of the other section of the long leaf between juxtaposed shorter leaves.

15. A vehicle spring construction comprising a long leaf formed in alined sections adapted to be connected at their remote ends to the vehicle frame, a plurality of shorter leaves superimposed upon opposite sides of and overlapping the adjacent ends of the long leaf, means clamping the superimposed leaves and one of the sections of the long leaf to the axle and means for slidably securing the adjacent end of the other section of the long leaf between juxtaposed shorter leaves, the adjacent ends of the long leaf section presenting relatively diverging surfaces adapted to discharge material which may accumulate between the said adjacent ends of the leaf sections.

In testimony whereof, I have signed my name to this specification.

RALPH M. LOVEJOY.